United States Patent [19]

Studer

[11] 4,315,197

[45] Feb. 9, 1982

[54] LINEAR MAGNETIC MOTOR/GENERATOR

[75] Inventor: Philip A. Studer, Silver Spring, Md.

[73] Assignee: The United States of America as represented by the Administrator of the National Aeronautics and Space Administration, Washington, D.C.

[21] Appl. No.: 119,336

[22] Filed: Feb. 7, 1980

[51] Int. Cl.³ ............................................. H02K 41/02
[52] U.S. Cl. .................................. 318/135; 335/229; 335/266; 310/12
[58] Field of Search .................... 310/12, 15; 335/266, 335/229, 236; 318/135

[56] References Cited

U.S. PATENT DOCUMENTS

| 3,755,699 | 8/1973 | Cartwright | 310/12 |
| 3,859,547 | 1/1975 | Massie | 335/229 |
| 4,127,835 | 11/1978 | Knutson | 335/229 X |

*Primary Examiner*—B. Dobeck

*Attorney, Agent, or Firm*—John O. Tresansky; John R. Manning; Robert D. Marchant

[57] ABSTRACT

A linear magnetic motor/generator (10) is disclosed which uses magnetic flux to provide mechanical motion or electrical energy. The linear magnetic motor/generator (10) includes an axially movable actuator mechanism (12). A permanent magnet mechanism (14) defines a first magnetic flux path (16) which passes through a first end portion (18) of actuator mechanism (12). Another permanent magnet mechanism (20) defines a second magnetic flux path (22) which passes through a second end portion (24) of actuator mechanism (12). A drive coil (26) defines a third magnetic flux path (28) passing through a third central portion (30) of actuator mechanism (12). Drive coil (26) selectively adds magnetic flux to and subtracts magnetic flux from magnetic flux flowing in the first and second magnetic flux paths (16) and (22), respectively, for supplying an axial force to the actuator mechanism (12).

32 Claims, 12 Drawing Figures

LINEAR MAGNETIC MOTOR/GENERATOR

ORIGIN OF THE INVENTION

The invention described herein was made by an employee of the United States Government and may be manufactured and used by or for the Government for governmental purposes without the payment of any royalties thereon or thereof.

TECHNICAL FIELD

This invention relates generally to motors/generators and more particularly to linear magnetic motors/generators.

In many industrial areas linear motors/generators are extremely useful in contrast to conventional rotary motors/generators. One such use is in the compressors of cryogenic refrigerators where the extreme low temperatures for cryogenic operation reduces the life of conventional equipment for producing linear motion. In particular, when cryogenic refrigerators are used in remote and inaccessible areas, such as outer space, the requirements for indefinite life and the absence of wear on the mechanical parts are essential. The prior art devices are unable to provide these requirements.

BACKGROUND ART

The customary manner of producing linear motion is to use conventional rotary motors/generators which are coupled by conventional linear convertors. These devices require many attendant cranks and linkages which are subject to wear thereby limiting the life of the apparatus. In addition, when such devices are subjected to environmental extremes, the various motor seals and other critical elements do not function properly, thereby causing equipment failure.

To partially alleviate the problems inherent in conventional rotary to linear conversion devices, linear motors/generators have been developed. However, such linear motors/generators require various seals and contacting members which tend to fail in such usage because of frictional wear of bearings and seals supporting the linear moving elements. Although lubricants have been used to reduce the frictional wear, these have been found not to function properly and tend to compromise the peformance of heat exchangers and other functional elements peculiar to refrigeration needs. To eliminate the bearing wear problem, some prior art linear motors/generators employ gas bearings having linear elements supported by gas. These gas bearings have not met with great success because they tend to lose their support at start-up and at the end of the linear stroke of the element. In the alternative, pressurized gas supplies are not generally available without adding greatly to the cost and weight of the system. Thus, in outer space where cost, weight, and simplicity are of vital importance, gas bearings are impractical.

Conventional magnetic bearings eliminate many of the attendant problems associated with other types of bearings. Conventional magnetic bearings perform exceptionally well when the element being supported is stationary or rotating about the axis. However, when linear motion is imparted, non-linear side forces are introduced which produce excessive radial movement of the element causing the element to contact the various parts of linear motors/generators. In addition, in conventional magnetic bearings the air gap between the magnetic bearing surfaces and the supported element needs to be as small as possible. The minimum air gap requirement of conventional magnetic bearings creates a number of disadvantages in linear motors/generators. One disadvantage is that with a minimum air gap any radial movement of the supported element will cause contact between the magnetic elements and the supported element causing friction and binding. Additionally, once the supported element contacts a magnetic element, the supported element will be magnetically coupled thereto. Another disadvantage is that when using a magnetic force to actuate the supported element linearly, the axial force increases proportionally with the air gap; i.e., the larger the gap the greater the force. This action directly conflicts with the minimum air gap requirement of conventional magnetic bearings. A further disadvantage associated with state of the art linear motors/generators is that they are uni-directional. The work supplied by motors/generators is only accomplished by the supported member when it linearly moves in one direction along the axis. To continue operating, the supported member must be returned to its neutral, or starting, position and the same force reapplied. This mode of operation is inefficient.

Accordingly, one object of the invention is to provide an improved linear magnetic motor/generator.

Another object of this invention is to provide a linear magnetic motor/generator which is relatively simple and economical.

Still another object of this invention is to provide a virtually friction free linear magnetic motor/generator.

A further object of the invention is to provide a linear magnetic motor/generator which operates efficiently and effectively at environmental extremes.

A still further object of this invention is to provide a linear magnetic motor/generator which maintains support throughout the operating cycle.

Another object of the invention is to provide a linear magnetic motor/generator that compensates for applied radial forces.

A further object of the invention is to provide a linear magnetic motor/generator wherein no minimum air gap requirement exists.

A still further object of the invention is to provide a bidirectionally operating linear magnetic motor/generator.

STATEMENT OF INVENTION

Briefly, these and other objects are obtained with a linear magnetic motor/generator having an axially movable actuator. A permanent magnet assembly defines a first magnetic flux path passing through a first portion of the actuator. Another permanent magnet assembly defines a second magnetic flux path passing through a second portion of the actuator. A drive coil defines a third magnetic flux path passing through a third portion of the actuator and selectively adds magnetic flux to and subtracts magnetic flux from magnetic flux flowing in the first and second magnetic flux paths for supplying an axial force to the actuator.

Other objects, features and advantages of the invention will be apparent from the following detailed description of the invention taken in conjunction with the accompanying drawings.

BRIEF DESCRIPTION OF DRAWINGS

In the drawings like parts are designated by the same references in the figures, wherein.

DETAILED DESCRIPTION OF THE INVENTION

Figure 1:
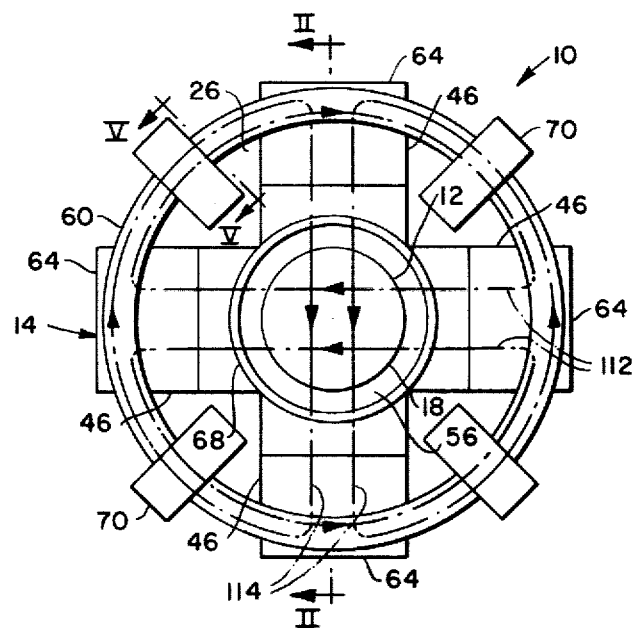
FIG. 1 is an end view of the preferred embodiment of the invention.
Figure 2:
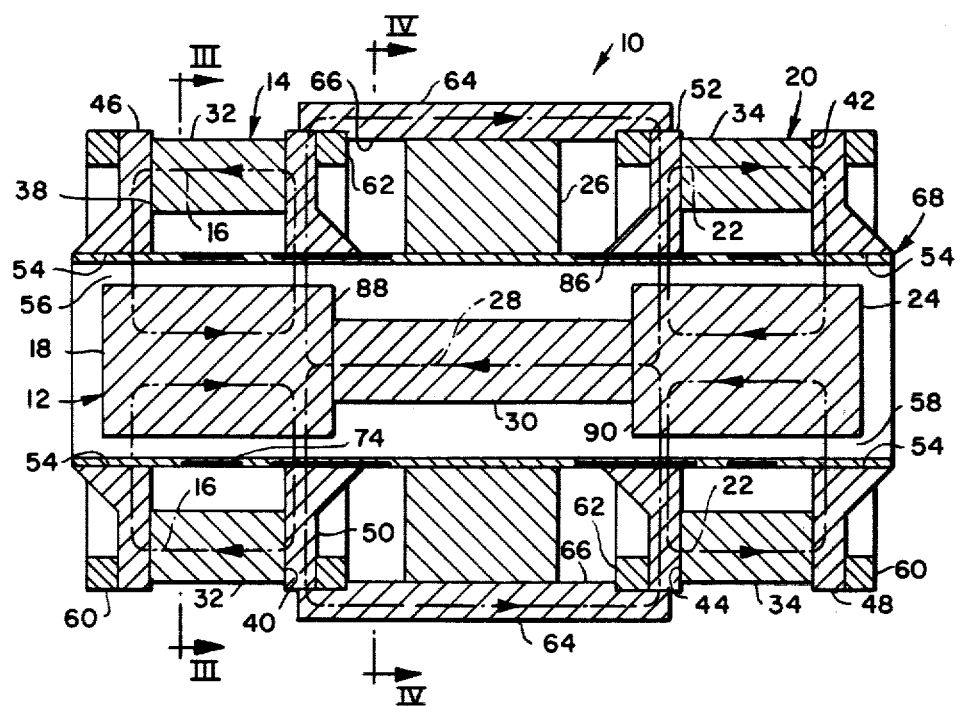
FIG. 2 is a side view in cross-section taken along the lines II—II of FIG. 1 showing the magnetic flux paths through the invention.

FIGS. 1 and 2 illustrate one embodiment of a linear magnetic motor/generator, generally designated by numeral 10. The motor/generator includes an axially movable actuator, generally designated by numeral 12. A permanent magnet mechanism, generally designated by numeral 14, defines a first magnetic flux path 16 passing through a first end portion 18 of the actuator. Another permanent magnet mechanism, generally designated by numeral 20, defines a second magnetic flux path 22 passing though a second end portion 24 of the actuator. A drive coil 26 defines a third magnetic flux path 28 passing through a third center portion 30 of the actuator and selectively adds magnetic flux to and subtracts magnetic flux from magnetic flux flowing in the first and second magnetic flux paths for supplying an axial force to the actuator.

More particularly, actuator 12 is preferably cylindrical having a first end portion 18 and second end portion 24 axially interconnected by a third and center portion 30. The end portions are preferably of the same diameter with the center portion having a substantially reduced diameter. Because magnetic flux will be passing through the various portions of the actuator, eddy currents will be set up which are detrimental to the magnetic operation of the actuator. To minimize the eddy current effects, each of portion 18, 24 and 30 are each preferably made of four individual steel segments bonded together with a conventional insulating adhesive. Additionally, portions 18 and 24 may have a ferrite ring surrounding the four segments thereof.

Figure 3:
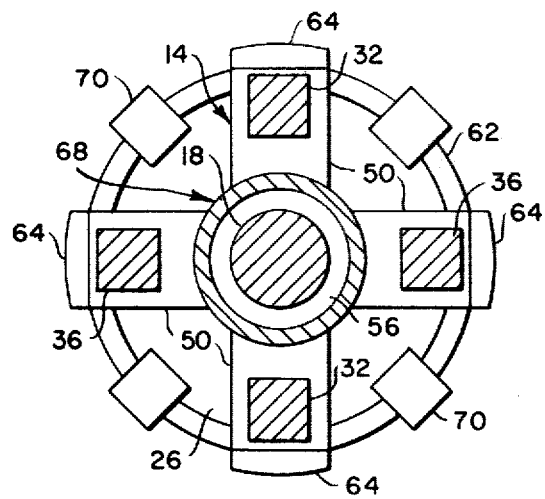
FIG. 3 is an end view in cross-section taken along the lines III—III of FIG. 2 showing the circumferential distribution of the permanent magnets.

Referring also to FIG. 3, the two permanent magnet mechanisms 14 and 20 each include a first pair of transversely and symmetrically mounted magnets, 32 and 34, respectively. Permanent magnet mechanisms 14 and 20 also include a second pair of transversely and symmetrically mounted magnets which are substantially aligned transverse to the axis of the first pair of magnets and are substantially radially aligned therewith. Only the second pair of magnets 36 for permanent magnet mechanism 14 is shown in FIG. 3.

For the motor/generator 10 to function properly the polarity of the axially aligned magnets in permanent magnet mechanisms 14 and 20 must be of reverse polarity. As illustrated in FIG. 2, the magnets in permanent magnet mechanism 14 are to be orientated so that the north pole is at surface 38 and the south pole is at surface 40. In turn, the magnets in permanent magnet mechanism 20 are orientated so that the north pole is at surface 42 and the south pole is at surface 44.

Permanent magnet mechanisms 14 and 20 each contain magnetically soft end pieces 46, 50, and 48, 52, respectively. Outer end pieces 46 and 48 may be held in place by the north pole of the respective magnets while inner end pieces 50 and 52 may be held in place by the south pole of the respective magnets or by any other conventional mechanical attachment. Preferably, the end pieces are shaped as shown in FIGS. 1-3 and extend inwardly toward the actuator so that surfaces 54 thereof extend beyond the magnets. The surfaces 54 of end pieces 46 and 50 are spaced from end portion 18 of the actuator to form a gap 56 therebetween and surfaces 54 of end pieces 48 and 52 are spaced from end portion 24 of the actuator to form a gap 58 therebetween. Because magnetic flux flows through the end pieces from the magnets, eddy currents will be introduced. To minimize the eddy current effects, it is preferred that the end pieces be made from laminated steel.

Each of permanent magnet mechanisms 14 and 20 further include a magnetically soft ring 60 magnetically coupled by the magnets or mechanically coupled to the outer periphery of each of end pieces 46 and 48. Another magnetically soft ring 62 is magnetically coupled by the magnets or mechanically coupled to the outer periphery of each of end pieces 50 and 52. Accordingly, rings 60 and 62 maintain each of the end portions of the actuator so that the spacing of gaps 56 and 58 will be maintained constant.

A plurality of equidistantly spaced magnetically soft bridges 64 interconnect permanent magnet mechanisms 14 and 20 in an axially spaced configuration. As illustrated in FIGS. 1-3 four bridges span between end pieces 50 and 52. The bridges are coupled to end pieces 50 and 52 and rings 62 by the magnets in the permanent magnet mechanisms 14 and 20 or by any other conventional mechanical attachment. Again, the magnetic flux flowing through the bridges will introduce eddy currents which may be minimized by making the bridges of laminated steel.

Figure 4:
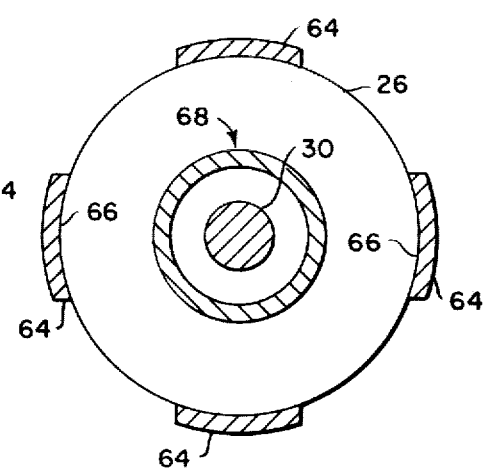
FIG. 4 is an end view in cross-section taken along the lines IV—IV of FIG. 2 showing the drive coil surrounding the actuator.

Referring to FIGS. 2 and 4, drive coil 26 surrounds center portion 30 of actuator 12 between end pieces 50 and 52. Preferably, the drive coil has an outer diameter substantially the same as the diameter between opposed inner surfaces 66 of bridges 64. Thus, coil 26 is held centered around portion 30. The inner diameter of coil 26 preferably should also be substantially the same as the diameter between surfaces 54 of end pieces 50 and 52.

Referring to FIG. 2 the magnetic flux path 16 produced by permanent magnet mechanism 14 extends from the north pole surface 38 of magnets 32, inwardly through end pieces 46, across gap 56, through end portion 18 of actuator 12, back across the gap, and outwardly through end pieces 50 into the South pole surface 40 of magnets 32. The second magnetic flux path 22 produced by permanent magnet mechanism 20 extends from the north pole surface 42 of magnets 34 inwardly through end pieces 48, across gap 58, through end portion 24 of the actuator, back across the gap, and outwardly through end pieces 50 into the south pole surface 44 of magnets 34. Although the two magnetic flux paths are illustrated only through the first pairs of magnets 32 and 34 of the permanent magnet mechanisms 14 and 20, it should be understood that the first and second flux paths also extend in the same manner through the second pairs of magnets in each of the permanent magnet mechanisms.

The third magnetic flux path 28 extends in either the clockwise or counterclockwise direction depending on the direction of the current flowing in drive coil 26. For discussion purposes the third magnetic flux path will be assumed to be in the clockwise direction, as shown in FIG. 3. The third magnetic flux path extends axially through center portion 30 of the actuator, into a section of end portion 18, outwardly across gap 56, through end pieces 50, axially through magnetic bridges 64, inwardly through end pieces 52, across gap 58, into a section of end portion 24 and back into the center portion 30 of the actuator.

Figure 7:
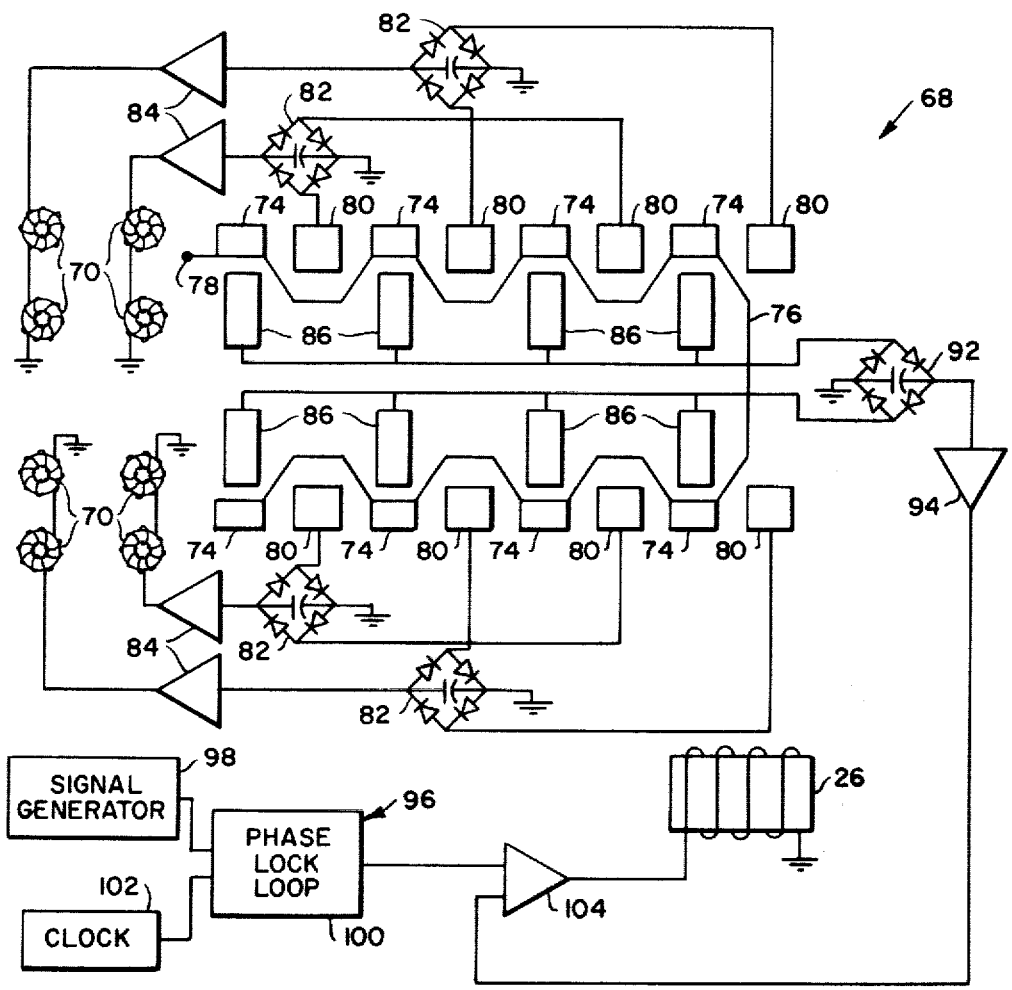
FIG. 7 is a schematic diagram of the actuator position sensing circuit.

The preferred manner of holding actuator 10 is to magnetically suspend the actuator substantially centered between surfaces 54 of end pieces 46, 48, 50, and 52. To properly suspend the actuator, an actuator position sensing circuit, generally indicated by numeral 68 in FIG. 7, is used which senses a capacitance variation when a change in gap distance exists between surfaces 54 of the end pieces and end portions 18 and 24 of the actuator. The sensing circuit also senses a capacitance variation in the magnitude of the axial movement of the actuator. The sensing circuit is coupled to a plurality of suspension coils 70 and selectively varies the current flowing in the sensing coils, thereby selectively varying the magnetic flux flowing in flux paths 112 and 114 shown in FIG. 1. The sensing circuit is also coupled to drive coil 26 so that the current flowing in the drive coil can be varied to obtain the correct bidirectional axial force on the actuator.

Figure 6:
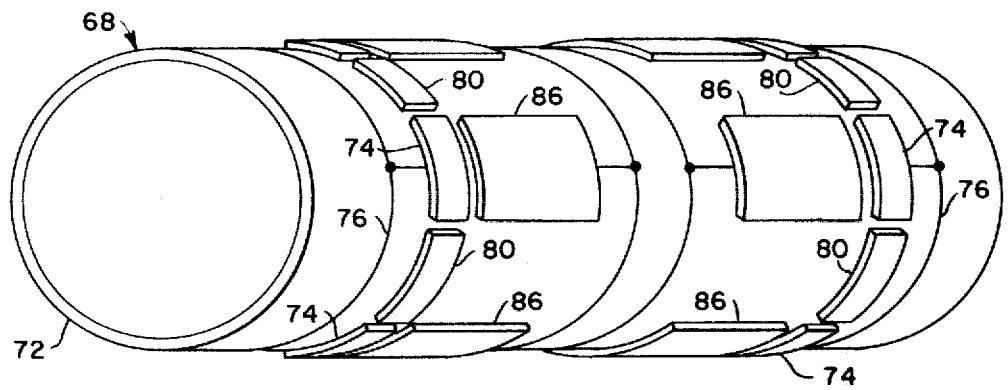
FIG. 6 is a perspective view of the cylinder containing the electrodes of the sensing device.

As more clearly shown in FIGS. 6 and 7, sensing circuit 68 has a cylindrical substrate 72 preferably formed of Teflon. Substrate 68 surrounds actuator 12 within gaps 56 and 58 and has an inner surface diameter substantially greater than the diameters of end portions 18 and 24 of the actuator, thereby maintaining gaps 56 and 58. A plurality of copper electrodes 74 are etched in two sets on the outer surface of the substrate in any conventional manner. One set of electrodes circumscribes the substrate substantially mid-way between the ends of end portion 18 of the actuator and the other set circumscribes the substrate substantially mid-way between the ends of the end portion 24 of the actuator when the actuator is in the neutral position. The electrodes 74 are electrically coupled in series by a conductor 76 etched on the substrate. One end of conductor 76 is connected at input terminal 78 to a conventional signal generator (not shown) capable preferably of producing a 1 MHZ signal. The sensing circuit also includes a plurality of copper electrodes 80 conventionally etched in two sets on substrate 72. Electrodes 80 are located between adjacent electrodes 74. Diametrically opposed pairs of electrodes 80 in each set are connected across conventional rectifying bridges 82. The outputs of the rectifying bridges are fed to individual conventional proportional differential amplifiers 84 and the amplified output signals therefrom are fed to suspension coils 70 thereby controlling the amount of current flowing through coils 70.

Sensing circuit 68 also includes another plurality of copper electrodes 86 in two sets. One set of electrodes 86 is circumferentially etched on substrate 72 so that they are substantially centered over end 88 of end portion 18 of the actuator and the other set of electrodes 86 is circumferentially etched on substrate 72 so that they are substantially centered over end 90 of end portion 24 of the actuator when the actuator is in the neutral position. Electrodes 86 surrounding end 88 are connected in series to one side of a conventional rectifying bridge 92 and the other set of electrodes 86 surrounding end 90 are connected in series to the other side of bridge 92. The output of bridge 92 is fed to a conventional differential amplifier 94 which produces a proportional output which is ultimately fed to drive coil 26 thereby controlling the amount of current flowing through the drive coil. Sensing circuit 68 may be surrounded by another cylinder (not shown) formed of glass, or the like, to protect the electrodes from the environment and physically locating surfaces 54 of the magnetic poles.

When the magnetic motor/generator 10 is to be used in the motor mode; i.e., when actuator 12 produces mechanical movement, drive coil 26 is supplied with a velocity control circuit, generally designated by numeral 96, to control the rate of axial movement of the actuator. Any conventional control circuit may be used; however, it is preferred that a conventional velocity signal generator 98 be used to supply a velocity signal to a conventional phase lock loop 100. Also supplied to the phase lock loop is a signal from a clock 102 which at certain intervals will reverse the direction of the current flowing to coil 26 to reverse the axial motion of the actuator. In this manner the actuator can produce mechanical motion in both axial directions making the motor bidirectional. The signal from the phase lock loop is supplied to a differential amplifier 104. Also supplied to differential amplifier 104 is the error signal generated from differential amplifier 94 indicating whether a change in current is needed to coil 26 to speed up or slow down the axial movement of actuator 12. Thus, the output of differential amplifier 104 is a varying current which is supplied to the drive coil 26 and consequently the velocity and axial direction of the actuator is controllable by changing the force exerted on the actuator.

Figure 8:
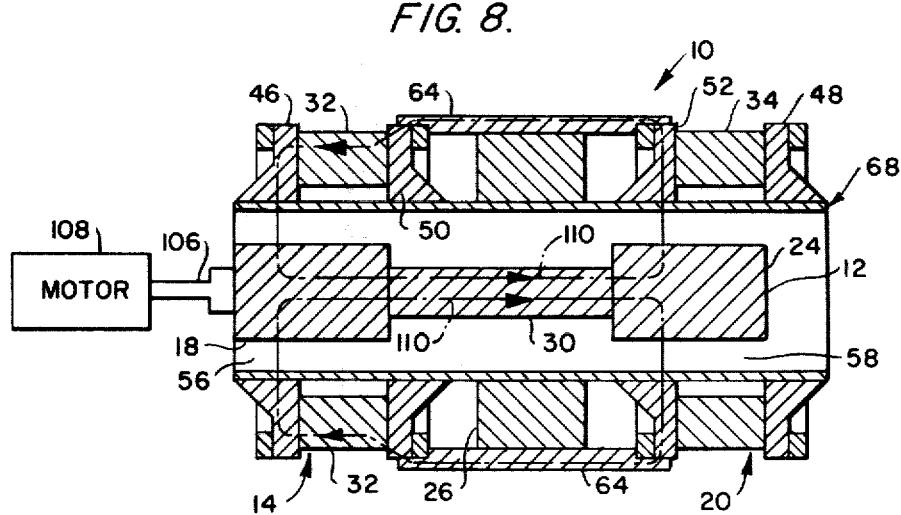
FIG. 8 is a side view in cross-section showing the flux path when the invention is used as a generator.

Referring to FIG. 8, when the magnetic motor/generator 10 is to be used in the generator mode, actuator 12 is coupled to a piston 106 of a reciprocating engine 108. When the actuator is axially displaced toward one end of generator 10, the left end as illustrated in FIG. 8, the magnetic flux from magnets 32 and 36 of permanent magnet mechanism 14 flows as shown by flux path 110. Because end portion 18 of the actuator is now proximate to only outer end pieces 46, the first flux path is unable to cross gap 56 and enter inner end pieces 50. Similarly, because end portion 24 of the actuator is now moved from proximity to end pieces 48, the magnetic flux from magnets 34 of permanent magnet mechanism 20 is unable to cross gap 58 and enter end portion 48 of the actuator thereby reducing magnetic flux flow in flux path 22 (FIG. 2). The flux from magnets 32 of permanent magnet mechanism 14 flows from the North pole of the magnets through end pieces 46, across gap 56, axially through portions 18 and 30, into a section of end portion 24, across gap 58, through end pieces 52, axially through bridges 64, through a section of end pieces 50, and into the South pole of magnet 32. As the magnetic flux flows through center portion 30, it flows axially through coil 26 which causes magnetic lines of force to cut through the windings therein. This interaction induces a current to be generated within drive coil 26 which can be used to energize the electro-responsive mechanisms.

In turn, if the actuator is pushed by the piston and engine to the other end of the generator, the magnetic flux flows in the opposite direction through the actuator thereby causing the induced current to flow in the opposite direction in the coil. Thus, by continuously moving the actuator from one end to the other end of the generator, an alternating current is developed in coil 26.

Figure 5A:
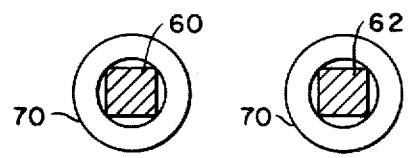
FIG. 5A is a side view in cross-section taken along the lines V—V of FIG. 1 showing the suspension coils surrounding each of the rings.

Referring to FIGS. 1, 3, 5A and 5B, it is preferred that actuator 12 be magnetically suspended within cylindrical substrate 72 forming gaps 56 and 58. In this manner the actuator will not be subjected to frictional forces when axial movement is produced. However, the axial movement produces radial side forces which tend to move the actuator off-center. Suspension coils 70 vary and control the magnetic flux radial distribution so as to support rather than decenter the actuator. Preferably, the suspension coils are coupled to electrodes 80 of sensing circuit 68. Each of the suspension coils are wound around rings 60 and 62 between adjacent end pieces 46, 48, 50, and 52 as illustrated in FIGS. 1, 3, and 5A. This configuration provides four suspension coils wound around each of rings 60 and 62 for a total of sixteen.

Figure 5B:
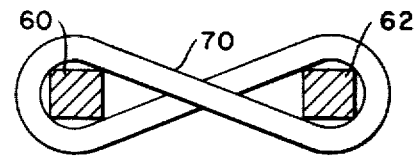
FIG. 5B is a side view in cross-section taken along the lines V—V of FIG. 1 showing an alternate embodiment of the suspension coils.

An alternate embodiment of suspension coils 70 is illustrated in FIG. 5B. In this configuration each suspension coil is wound around both of rings 60 and 62 between adjacent end pieces 46 and 50 of permanent magnet mechanism 14 and around both of rings 60 and 62 between adjacent end pieces 48 and 52 of permanent magnet mechanism 20 in a figure eight configuration. This configuration reduces the number of suspension coils from sixteen to eight.

Referring to FIG. 1, suspension coils 70 produce transverse magnetic flux paths 112 and 114. Because all the flux paths 112 and 114 are the same although of opposite polarity, through each of rings 60 and 62, only flux paths 112 and 114 through ring 60, as illustrated in FIG. 1, will be described. When coils 70 are energized, magnetic flux in flux path 112 flows through ring 60 and into end piece 46, across gap 56 and into end portion 18 of actuator 12, transversely across gap 56 and into opposed end pieces 46, and back into ring 60. Simultaneously, the magnetic flux in flux path 114 flows through ring 60 and into end piece 46, across gap 56 and into end portion 18 of actuator 12, across gap 56 and into opposed end pieces 46, and back into ring 60. When the current flowing through the suspension coils is reversed, the directions of flux paths 112 and 114 are also reversed.

In the operation of motor/generator 10 in the motor mode, axial movement of actuator 12 is based on the principle that an axial force is developed between end portion 18 and 24, between which the magnetic flux from magnetic coil 26 passes. This axial force is expressed by the equation $F = \pi r \beta^2 g / \mu$ where F is the axial force, $\pi$ is the constant pi, r is the radius of the end portions of the actuator, $\beta$ is the magnetic intensity, g is the air gap dimension, and $\mu$ is the magnetic permeability of the actuator. As can be seen from the equation, the axial force increases in proportion to the air gap dimension. This phenomenon is in contrast to most axial motors which ideally need a minimum air gap.

When the actuator is axially centered within motor/generator 10, the magnetic flux individually flowing in magnetic flux paths 16 and 22, passes into and out of end portions 18 and 24, respectively, of actuator 12 with no magnetic flux passing through center portion 30 of the actuator. In addition, the magnetic flux flowing in flux path 16 is in the opposite direction to the magnetic flux flowing in flux path 22. When drive coil 26 is energized by velocity control circuit 96, magnetic flux flows through flux path 28 through the center portion of the actuator. If the magnetic flux flowing in portion 30 of the actuator is in the direction indicated by the arrows in FIG. 2, the magnetic flux within air gap 56 will be increased because the magnetic flux in flux paths 16 and 28 are flowing in the same direction and will be cumulative. In turn, the magnetic flux within air gap 58 will be decreased because the magnetic flux flowing in flux path 22 and flux path 28 are flowing in opposite directions and are deductive from each other. The net result is an axial force toward the left side of FIG. 2 which propels the actuator in that direction. Upon command by clock 102 of velocity control circuit 96 the current within the drive coil is reversed thereby causing the magnetic flux to flow in the opposite direction in flux path 28. When this happens, the magnetic flux within air gap 56 is decreased and the magnetic flux within air gap 58 is increased causing an axial force toward the right side of FIG. 2 which propels the actuator in that direction. The current within coil 26 is continually reversed by clock 102 so that the actuator continually axially reciprocates. Thus, the actuator can produce mechanical movement in both axial directions making motor/generator 10 truly a bidirectional motor.

During the axial movement of actuator 12, actuator position sensing circuit 68 is monitoring the axial velocity of the actuator through capacitive variation between electrodes 74 and 86. Electrodes 74 are supplied with the RF signal at terminals 78 through capacitive action and a signal is supplied by electrodes 86 to both sides of bridge 92. When the actuator is centered so that the area of the electrodes 86 covering the end portions 18 and 24 are substantially the same, the signal supplied to both sides of bridge 92 will be the same. However, when the actuator is to the left-of-center, the area of electrodes 86 surrounding actuator end portion 24 will be more than the area of electrodes 86 surrounding end portion 18 thereof. Consequently, bridge 92 will receive different signals and will provide an error signal which is supplied to differential amplifier 104. If the error signal is above a certain threshold level, a change is produced in current to the drive coil 26. This, in turn, changes the magnetic flux within flux path 28 and changes the force on the actuator which varies the axial velocity of the actuator. Although the circuit operation has been described with the actuator moving to the left, it should be understood that the circuit operates the same when the actuator is moving to the right.

Also, during axial movement of actuator 12 various radial forces may be applied which tend to move the actuator radially. Because gaps 56 and 58 can be made as large as practical, this gap distance is also important with respect to the radial suspension of the actuator. The radial instability of the actuator decreases as the gap dimension is made larger and cosequently, a large magnetic gap allows the introduction of a non-magnetic wall between the actuator and substrate 72 of actuator position sensing circuit 68. Thus, in a practical sense the actuator can be placed in a pressurized environment, such as a cryogenic refrigerator, or can be placed in a vacuum while suspension coils 70 and drive coil 26 are isolated and protected.

For radial control of actuator 12, capacitive action between electrodes 74 and 80 is used. As is illustrated in FIG. 7, four electrodes 80 surround each of the end portions of the actuator; one pair of radially opposed electrodes 80 control vertical motion of the actuator and one pair of radially opposed electrodes 80 control horizontal motion. Each pair of radially opposed electrodes 80 are connected to bridges 82. Thus, an error signal is produced by bridges 82 when the gap distance between the actuator and one radially opposed electrode 80 is different from the gap distance between the actuator and the other radially opposed electrode because the capacitive variation introduced by the changing gap distance produces different signals on each side of bridges 82. This error signal is supplied to the appropriate suspension coil 70 to produce magnetic flux within magnetic flux paths 112 or 114. The magnetic flux from the suspension coils will flow through gaps 56 and 58 and into the end portions of the actuator. The variance of magnetic flux within gaps 56 and 58 will counteract the radial forces and recenter the actuator.

Figure 9:
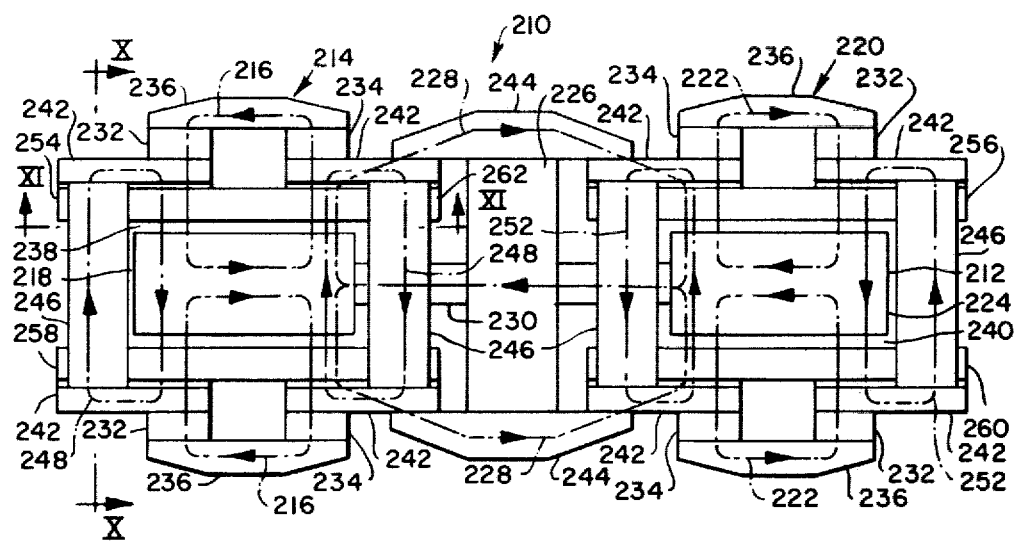
FIG. 9 is a side view of an alternate embodiment of the invention showing the magnetic flux paths through the invention.
Figure 10:
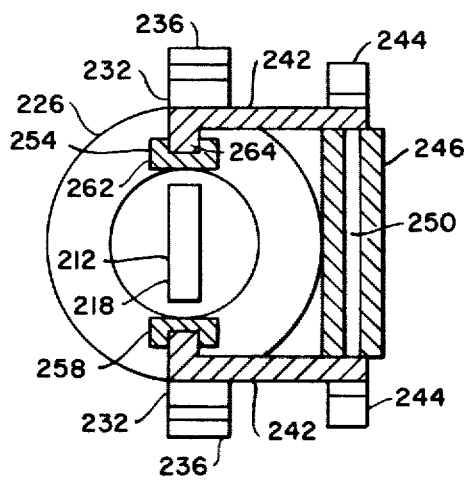
FIG. 10 is an end view in cross-section taken along the lines X—X of FIG. 9 showng the drive and suspension coils.
Figure 11:
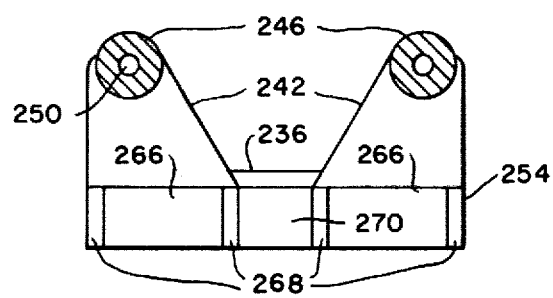
FIG. 11 is a cross-sectional view taken along the lines XI—XI of FIG. 9 showing the electrodes of the sensing device.

An alternative of the invention designated by numeral 210, is illustrated in FIGS. 9–11. The primary difference between embodiment 210 and embodiment 10 is that embodiment 210 is not cylindrical and has magnetic flux flowing in only the vertical plane rather than both the vertical and horizontal planes.

Motor/generator 210 includes an axially movable actuator 212. A permanent magnet mechanism, generally indicated by numeral 214, defines a first magnet flux path 216 passing through a first end portion 218 of the actuator. Another permanent magnet mechanism 220 defines a second magnetic flux path 222 passing through a second end portion 224 of the actuator. A drive coil 226 defines a third magnetic flux path 228 passing through a third center portion 230 of the actuator and selectively adds magnetic flux to and subtracts magnetic flux from the magnetic flux flowing in the first and second magnetic flux paths 216, 222 for supplying an axial force to the actuator.

Each of permanent magnet mechanisnms 214 and 220 include a pair of transverse and symmetrical permanent magnets 232 and 234 which are axially spaced and coupled together by magnetic bridges 236. The magnets forming permanent magnet mechanism 214 are oppositely polarized from the magnets forming permanent magnet mechanism 220 so that the magnetic flux in the first magnetic flux path 216 flows in the opposite direction from the magnetic flux in the second magnetic flux path 222. Magnets 232 and 234 are spaced from end portions 218 and 224 of actuator 212 forming gaps 238 and 240, respectively.

The first magnetic flux path 216 extends from the north pole of each magnet 232 in permanent magnet mechanism 214, across gap 238, axially through end portion 218 of actuator 212, recrosses gap 238, through magnets 234, through bridges 236 and into the south pole of magnets 232.

The second magnetic flux path 222 extends from the north pole of each magnet 232 in permanent magnet mechanism 220 across gap 240, axially through end portion 224 of actuator 212, recrosses gap 240, through magnets 234, axially through bridges 236, and reenters the south pole of magnet 232.

Each of permanent magnet mechanisms 214 and 220 includes magnetically soft flanges 242 magnetically or mechanically coupled to each of magnets 232 and 234. Magnetic bridges 244 couple the permanent magnet mechanisms 214 and 220 together by being magnetically or mechanically coupled to flanges 242 which are coupled to axially opposed magnets 234.

Drive coil 226 surrounds center portion 230 of actuator 212. The drive coil has an outer diameter substantially the same as the distance between the inner surfaces of bridges 244. Thus, bridges 244 hold the drive coil substantially centered around the center portion of the actuator.

The third magnetic flux path 228 can extend in either the clockwise or counterclockwise direction depending on the direction of the current flowing in drive coil 226. For illustration purposes the third magnetic flux path will be described in the clockwise manner. The third magnetic flux path extends axially through center portion 230 of actuator 212, into a section of end portion 218 of the actuator, across gap 238, through flange 242, axially through bridge 244, into flange 242, across gap 240, into a section of end portion 224 of the actuator, and back into the center portion of the actuator.

Motor/generator 210 further includes a plurality of electromagnetic suspension coils 246, each of which is magnetically or mechanically coupled between opposed flanges 242 of each of the permanent magnet mechanisms. When the suspension coils associated with the permanent magnet mechanism 214 are energized, a magnetic flux path 248 is created which extends through a magnetically soft core 250 in the suspension coils, through flanges 242, across gap 238, vertically through end portion 218 of actuator 212, back across gap 238, through opposed flange 242, and back into core 250. In turn, when the suspension coils associated with the permanent magnet mechanism 220 are energized a magnetic flux path 252 is created which extends through the magnetically soft core in the suspension coils, through the flanges, across gap 240, vertically through end portion 224 of the actuator, back across gap 240, through the opposed flange, and back into the core of the suspension coils.

Motor/generator 210 further includes an actuator position sensing circuit which is identical to that previously described for motor/generator 10 except for the arrangement of the various electrodes. This circuit, therefor, will not be further described except for the electrodes that indicate the axial movement of actuator 212 and that sense a change in gap distance by capacitive action.

Motor/generator 210 has four identical sets of electrodes 254, 256, 258, and 260, each of which contains three electrodes. Because all of the electrode sets are structurally identical, only set 254 will be explained in detail.

As more clearly shown in FIGS. 10 and 11, electrode set 254 includes a substrate support 262 formed of magnetically soft material, such as steel. The support is magnetically or mechanically coupled to an inwardly extending section 264 of flange 242 and extends axially between the outer ends of adjacent flanges 242. A pair of copper electrodes 266 are bonded to the inward surface of the substrate in any conventional manner so that they are axially spaced apart. Preferably, electrodes 266 are positioned on the substrate so that when actuator 212 is centered, substantially one half of each electrode 266 covers first portion 218 of the actuator. A plurality of insulating strips 268 are bonded to the substrate at each end of electrodes 266. Another copper electrode 270 is bonded to the substrate in the space between electrodes 266 and separated therefrom by the insulating strips.

In electrode sets 258 and 260, electrodes 266 are connected in series to the R.F. signal while electrodes 270 are connected to one side of bridges 82 of sensing circuit 68 (FIG. 7). In turn, in electrode sets 254 and 256, electrodes 266 are connected to opposite sides of bridge 92 of sensing circuit 68 for indicating the velocity of axial movement of actuator 212 due to capacitive variation caused by the area change of electrodes 266 over end portions 218 and 224 during axial movement of the actuator. Electrodes 270 of sets 254 and 256 are connected to the other side of bridges 82 of the sensing circuit for sensing a change in gap distance through capacitive action.

The operation of motor/generator 210 in the generator mode is essentially the same as previously described for motor/generator 10 and, therefore, will not be described in detail. Generally, actuator 212 is connected to a motor and piston such as illustrated in FIG. 8. When the actuator is moved to the left-of-center, magnets 234 no longer cover first portion 218 of the actuator which disrupts magnetic flux path 216. The magnetic flux from magnets 232 now extend through flange 242, across gap 238, axially through end portion 218 of actuator 212, through center portion 230, into end portion 224 of actuator 212, across gap 240, through flanges 242, through bridges 244, through flanges 242, through magnets 234, through bridges 236, and back into magnets 232. The magnetic flux induced within center portion 230 causes current to flow within drive coil 226 which can be used to energize other electrical equipment. When the actuator is moved to the right-of-center the same procedure is followed except that the magnetic flux flows from magnets 232 in permanent magnet mechanism 220 and flows in the opposite direction through center portion 230. Thus, the motor/generator is a bidirectional alternating current generator.

In the motor mode, motor/generator 210 operates in the same manner as previously set forth for motor/generator 10 and, therefore, will not be described in detail. When a current is induced to flow in drive coil 226, magnetic flux flows through third magnetic flux path 228. If the magnetic flux is flowing in the clockwise direction the magnetic flux will be added to the magnetic flux within magnetic flux path 216 causing an increase in magnetic flux within gap 238. In turn, magnetic flux within the third magnetic flux path will be subtracted from the magnetic flux within magnetic flux paths 222 causing a decrease in magnetic flux within gap 240. This difference of magnetic flux within gaps 238 and 240 causes an axial force to be applied to the actuator propelling the actuator to the left. By reversing the current in coil 226, the magnetic flux flowing through the center portion of the actuator is reversed causing the magnetic flux in gap 238 to decrease and the magnetic flux in gap 240 to increase, causing the axial force to be applied to the right moving the actuator to the right. Thus, motor/generator 210 is also a bidirectional motor.

When motor/generator 210 is operating, the actuator position sensing circuit is supplying current at the correct intervals to drive coil 226. When actuator 212 is moved off-center, the area of electrodes 266 in sets 254 and 256 which cover end portions 218 and 224 is changed causing the capacitance between electrodes 266 to change which in turn produces different signals to be applied to opposite sides of bridge 92 (FIG. 7). This produces an error signal from bridge 92 which ultimately the drive coil to change the axial velocity of the actuator if the error signal is above the desired threshold level. In turn, electrodes 270 produce different signals to opposite sides of bridges 82 when the gap distance between electrode sets 254, 258, and 256, 260 are not the same due to capacitive action. This produces an error signal from bridges 82 which is provided to the appropriate suspension coil 246. This causes magnetic flux to flow in the appropriate directions in magnetic flux paths 248 and 252 for counteracting radial forces on actuator 212 and recenters the actuator.

A linear magnetic motor/generator has been described. Obvious modifications and variations of the motor/generator are possible in light of the above teachings. It is to be understood, therefore, that within the scope of the appended claims the motor/generator may be practiced otherwise than as specifically described and illustrated.

Accordingly, the invention having been described in its best embodiment and mode of operation, that which is desired to be claimed by Letters Patent is:

1. A linear magnetic motor/generator, comprising:
axially moveable actuator means having three portions;
permanent magnet means including a plurality of pairs of transverse and symmetrical magnets substantially aligned radially and transversely with a common axis and equidistantly spaced around and separated from a first portion of said actuator means, thereby defining a first magnetic flux path passing through said first portion of said axially moveable actuator means;
another permanent magnet means including another plurality of pairs of transverse and symmetrical magnets substantially aligned radially and transversely with said common axis and equidistantly spaced around and separated from a second portion of said actuator means thereby defining a second magnetic flux path passing through said second portion of said axially moveable actuator means;
a plurality of magnetically soft end pieces arranged in a plurality of arrays defining a gap between said end pieces and said actuator whereby facing pairs of said end pieces in adjacent arrays are coupled across opposite ends of said pluralities of permanent magnets; and
coil means defining a third magnetic path passing through a third portion of said axially moveable actuator means and selectively modulating magnetic flux flowing in said first and second magnetic flux paths for supplying an axial force to said axially moveable actuator means.

2. The linear magnetic motor/generator of claim 1 wherein said actuator means moves bidirectionally.

3. The linear magnetic motor/generator of claim 1 wherein said first and second flux paths within said gap between said end pieces and said actuator means are normal to the axis of movement of said actuator means.

4. The linear magnetic motor/generator of claim 1 wherein said magnetic flux modulated by said coil means is along sections of said first and second flux paths normal to the axis of movement of said actuator means.

5. The linear magnetic motor/generator of claim 1 wherein said permanent magnet means and
said end pieces are disposed outside the area of axial movement of said three portions of said actuator means thereby defining an open bore gap permitting unobstructed axial movement of said three portions.

6. The linear magnetic motor/generator of claim 5 further including:
a plurality of magnetically soft rings coupled to the peripheries of said end pieces opposite to said magnets.

7. The linear magnetic motor/generator of claim 6 further including a magnetic bridge means coupling said permanent magnet means with said other permanent magnet means.

8. The linear magnetic motor/generator of claim 7 wherein said magnetic bridge means includes a magnetically soft bridge coupled between axially opposed other magnetically soft end pieces of said permanent magnet means and said other permanent magnet means.

9. The linear magnetic motor/generator of claim 8 wherein said first flux path extends from each of said magnets in said plurality of pairs of magnets of said permanent magnet means through said end pieces, radially across said gap, axially through said first portion of said actuator means, radially across said gap, and through said end pieces.

10. The linear magnetic motor/generator of claim 9 wherein said second flux path extends from each of said magnets in said plurality of pairs of magnets of said other permanent magnet means through said end pieces, radially across said gap, axially through said second portion of said actuator means, radially across said gap, and through the opposite of said end pieces.

11. The linear magnetic motor/generator of claim 10 wherein said coil means surrounds said third portion of said actuator means.

12. The linear magnetic motor/generator of claim 11 further including means for axially moving said actuator means, said axial movement causing magnetic flux to flow through said third flux path which induces a current to flow in said coil means.

13. The linear magentic motor/generator of claim 11 wherein said third magnetic flux path extends axially through said third portion of said actuator means, selectively through one of said first portion or said second portion of actuator means, radially across said gap, through said other end pieces, through said magnetically soft bridges, through axially opposed end pieces, radially across said gap, and selectively through one of said second portion or said first portion of said actuator means.

14. The linear magnetic motor/generator of claim 13 further including:
means for inducing current to flow through said coil means, said current causing magnetic flux to pass through said third magnetic flux path causing an axial force to be applied to said actuator means for axial movement of said actuator means; and
means responsive to said axial movement for monitoring the magnitude of said axial movement of said actuator means.

15. The linear magnetic/generator of claim 14 further including:
means for sensing a change in gap distance between each of said end pieces and said actuator means; and
means responsive to said sensing means for varying the magnitude of magnetic flux flowing in said gap thereby maintaining said actuator means substantially centrally suspended between said plurality of magnets.

16. The linear magnetic motor/generator of claim 15 wherein said monitoring means and said sensing means include an actuator position sensing circuit coaxially disposed with said actuator means within said gap.

17. The linear magnetic motor/generator of claim 16 wherein said actuator position sensing circuit includes:
a cylindrical substrate;
a plurality of electrodes coupled to said cylindrical substrate, said electrodes including pairs of electrodes wherein said electrodes in each of said pairs of electrodes are radially opposed; and
a plurality of other electrodes coupled to said cylindrical substrate, said other electrodes including pairs of electrodes wherein said other electrodes in each of said pairs of electrodes are radially opposed.

18. The linear magnetic motor/generator of claim 17 wherein said varying means includes a plurality of suspension coils coupled to said rings.

19. The linear magnetic motor/generator of claim 18 wherein said sensing circuit selectively varies the current flowing in said suspension coils for varying the magnetic flux flowing in said gap.

20. The linear magnetic motor/generator of claim 19 wherein each of said suspension coils are would around said rings between adjacent and pieces.

21. The linear magnetic motor/generator of claim 19 wherein each of said suspension coils are wound around said rings between adjacent end pieces thereby coupling said rings together through said suspension coils.

22. The linear magnetic motor/generator of claim 1 wherein said plurality of magnets of said permanent magnet means and said other permanent magnet means are disposed in axially spaced pairs and each of said axially spaced pairs of magnets are coupled together by a magnetic bridge.

23. The linear magnetic motor/generator of claim 22 wherein said first flux path extends from said magnets of said pair, radially across said gap, axially through said first portion of said actuator means, radially across said gap, through said magnets of said other pair, and through said magnetic bridge.

24. The linear magnetic motor/generator of claim 23 wherein said second flux path extends from said magnets of said pair, radially across said gap, axially through said second portion of said actuator means, radially across said gap, through said magnets of said other pair, and through said magnetic bridge.

25. The linear magnetic motor/generator of claim 24 further including a plurality of magnetic bridges coupling said permanent magnet means and said other permanent magnet means together.

26. The linear magnetic motor/generator of claim 25 wherein said coil means surrounds said third portion of said actuator means.

27. The linear magnetic motor/generator of claim 26 wherein said third flux path extends axially through said third portion of said actuator means, selectively through said first portion or second portion of said actuator means, radially across said gap, through said magnetic bridges, radially across said gap and selectively through said second portion or said first portion of said actuator means.

28. The linear magnetic motor/generator of claim 27 further including means for axially moving said actuator means, said axial movement causing magnetic flux to flow through said third flux path, and said magnetic flux inducing a current to flow in said coil means.

29. The linear magnetic motor/generator of claim 27 further including:
   means for inducing current to flow through said coil means, said current causing magnetic flux to pass through said third magnetic flux path, and said magnetic flux causing an axial force to be applied to said actuator means for axial movement of said actuator means; and
   means responsive to said axial movement for monitoring the magnitude of said axial movement of said actuator means.

30. The linear magnetic motor/generator of claim 29 further including:
   means for sensing a change in gap distance between said plurality of magnets of said permanent magnet means and said actuator means and between said other permanent magnet means and said actuator means; and
   means responsive to said sensing means for varying the magnitude of magnetic flux flowing in said gap for maintaining said actuator means substantially centrally suspended between said plurality of magnets.

31. The linear magnetic motor/generator of claim 30 wherein said varying means includes a plurality of suspension coils magnetically coupled through said permanent magnet mechanism and said other permanent magnet mechanism to said first and second portions of said actuator means.

32. The linear magnetic motor/generator of claim 31 wherein said suspension coils selectively vary the current flowing therein for varying the magnetic flux flowing in said gap.

* * * * *